United States Patent
Hu et al.

(10) Patent No.: US 11,240,660 B2
(45) Date of Patent: Feb. 1, 2022

(54) UNIFIED SECURITY ARCHITECTURE

(71) Applicant: Alcatel Lucent, Nozay (FR)

(72) Inventors: Zhiyuan Hu, Shanghai (CN); Zhigang Luo, Shanghai (CN); Xueqiang Yan, Shanghai (CN)

(73) Assignee: ALCATEL LUCENT, Nozay (FR)

( * ) Notice: Subject to any disclaimer, the term of this patent is extended or adjusted under 35 U.S.C. 154(b) by 283 days.

(21) Appl. No.: 16/333,647

(22) PCT Filed: Sep. 18, 2016

(86) PCT No.: PCT/CN2016/099206
§ 371 (c)(1),
(2) Date: Mar. 15, 2019

(87) PCT Pub. No.: WO2018/049646
PCT Pub. Date: Mar. 22, 2018

(65) Prior Publication Data
US 2019/0261179 A1 Aug. 22, 2019

(51) Int. Cl.
*H04W 12/06* (2021.01)
*H04L 29/06* (2006.01)
(Continued)

(52) U.S. Cl.
CPC ......... *H04W 12/06* (2013.01); *H04L 63/0815* (2013.01); *H04L 63/0869* (2013.01);
(Continued)

(58) Field of Classification Search
CPC . H04W 12/06; H04W 12/04; H04W 36/0038; H04W 12/041; H04W 48/18;
(Continued)

(56) References Cited

U.S. PATENT DOCUMENTS 7,233,997 B1 * 6/2007 Leveridge ............... G06F 21/33
709/217
7,607,069 B1 10/2009 Cypher et al.
(Continued)

FOREIGN PATENT DOCUMENTS

CN 101163056 A 4/2008
CN 101330723 A 12/2008
(Continued)

OTHER PUBLICATIONS

Extended European Search Report dated Mar. 27, 2020, issued in corresponding European Patent Application No. 16916026.4.
(Continued)

*Primary Examiner* — Huan V Doan
(74) *Attorney, Agent, or Firm* — Harness, Dickey & Pierce, P.L.C.

(57) ABSTRACT

A security service function chain is created including a set of security service functions. The security service function chain is created in response to instantiation of a given network partition (e.g., network slice) in a communication network (5G or similar network). The communication network supports instantiation of a plurality of network partitions for providing a respective plurality of network services. The security service function chain is utilized to perform at least one security service (e.g., authentication) for an entity (e.g., a subscriber or a device) accessing or seeking access to a network service (e.g., one of eMBB, massive IoT, and mission-critical IoT) corresponding to the given network partition.

26 Claims, 9 Drawing Sheets

200

| IDENTIFIER | AUTHENTICATION STATUS | AUTHENTICATION MECHANISM | ACTIVE AUTHENTICATION VECTORS/INFORMATION | RESERVED AUTHENTICATION VECTORS/INFORMATION | ADDRESS OF LEGACY AUTHENTICATOR | ... |
|---|---|---|---|---|---|---|
| IMSI#1 | SUCCESSFUL | EPS AKA | EPS AV | EPS AVs | | |
| IMSI#2 | SUCCESSFUL | UMTS AKA | UMTS AV | UMTS AVs | | |
| IMSI#3 | SUCCESSFUL | EPS AKA | N/A | N/A | MME ADDR. | |
| IMSI#4 | SUCCESSFUL | SSO | N/A | N/A | N/A | |
| ⋮ | ⋮ | ⋮ | ⋮ | ⋮ | | |
| MAC#1 | SUCCESSFUL | WPA/WPAII | PMK | PMKs | | |
| ⋮ | ⋮ | ⋮ | ⋮ | ⋮ | | |
| IMEI#1 | SUCCESSFUL | N/A | N/A | N/A | | |
| ⋮ | ⋮ | ⋮ | ⋮ | ⋮ | | |

(51) Int. Cl.
- *H04W 12/04* (2021.01)
- *H04W 36/00* (2009.01)
- *H04W 48/18* (2009.01)
- *H04W 12/00* (2021.01)
- *H04W 12/041* (2021.01)

(52) U.S. Cl.
CPC ....... *H04W 12/04* (2013.01); *H04W 36/0038* (2013.01); *H04W 12/009* (2019.01); *H04W 12/041* (2021.01); *H04W 48/18* (2013.01)

(58) Field of Classification Search
CPC ............. H04W 12/009; H04L 63/0815; H04L 63/0869
See application file for complete search history.

(56) References Cited

U.S. PATENT DOCUMENTS

| | | | | |
|---|---|---|---|---|
| 7,882,247 | B2* | 2/2011 | Sturniolo | H04W 12/03 709/228 |
| 9,762,402 | B2* | 9/2017 | Batz | H04M 15/8044 |
| 2003/0056114 | A1 | 3/2003 | Goland | |
| 2008/0072301 | A1* | 3/2008 | Chia | H04L 63/0815 726/8 |
| 2014/0044019 | A1* | 2/2014 | Anthony, Jr. | H04W 12/037 370/259 |
| 2014/0196113 | A1 | 7/2014 | Chen et al. | |
| 2016/0182684 | A1 | 6/2016 | Connor et al. | |
| 2017/0055153 | A1* | 2/2017 | Fransen | H04W 48/08 |
| 2017/0257870 | A1* | 9/2017 | Farmanbar | H04W 24/02 |
| 2017/0318450 | A1* | 11/2017 | Salkintzis | H04W 60/04 |
| 2017/0332212 | A1* | 11/2017 | Gage | H04L 41/0806 |
| 2017/0339688 | A1* | 11/2017 | Singh | H04W 76/11 |
| 2017/0367036 | A1* | 12/2017 | Chen | H04L 43/08 |
| 2018/0062847 | A1* | 3/2018 | Mildh | H04L 9/0643 |
| 2019/0123963 | A1* | 4/2019 | Tang | H04W 48/18 |

FOREIGN PATENT DOCUMENTS

| | | |
|---|---|---|
| CN | 102017677 A | 4/2011 |
| CN | 102843340 A | 12/2012 |
| CN | 102932382 A | 2/2013 |
| CN | 104106073 A | 10/2014 |
| CN | 104506406 A | 4/2015 |
| CN | 105721535 A | 6/2016 |

OTHER PUBLICATIONS

S. Shin et al., 'A First Step Toward Network Security Virtualization: From Concept to Prototype' *IEEE Transactions on Information Forensics and Security*, vol. 10, No. 10, Oct. 2015, pp. 2236-2249.
International Search Report PCT/ISA/210 for PCT International Application No. PCT/CN2016/099206 dated Jul. 12, 2017.
Chinese Office Action for Chinese Patent Application No. 201680090879.0 dated Nov. 1, 2021.

* cited by examiner

100

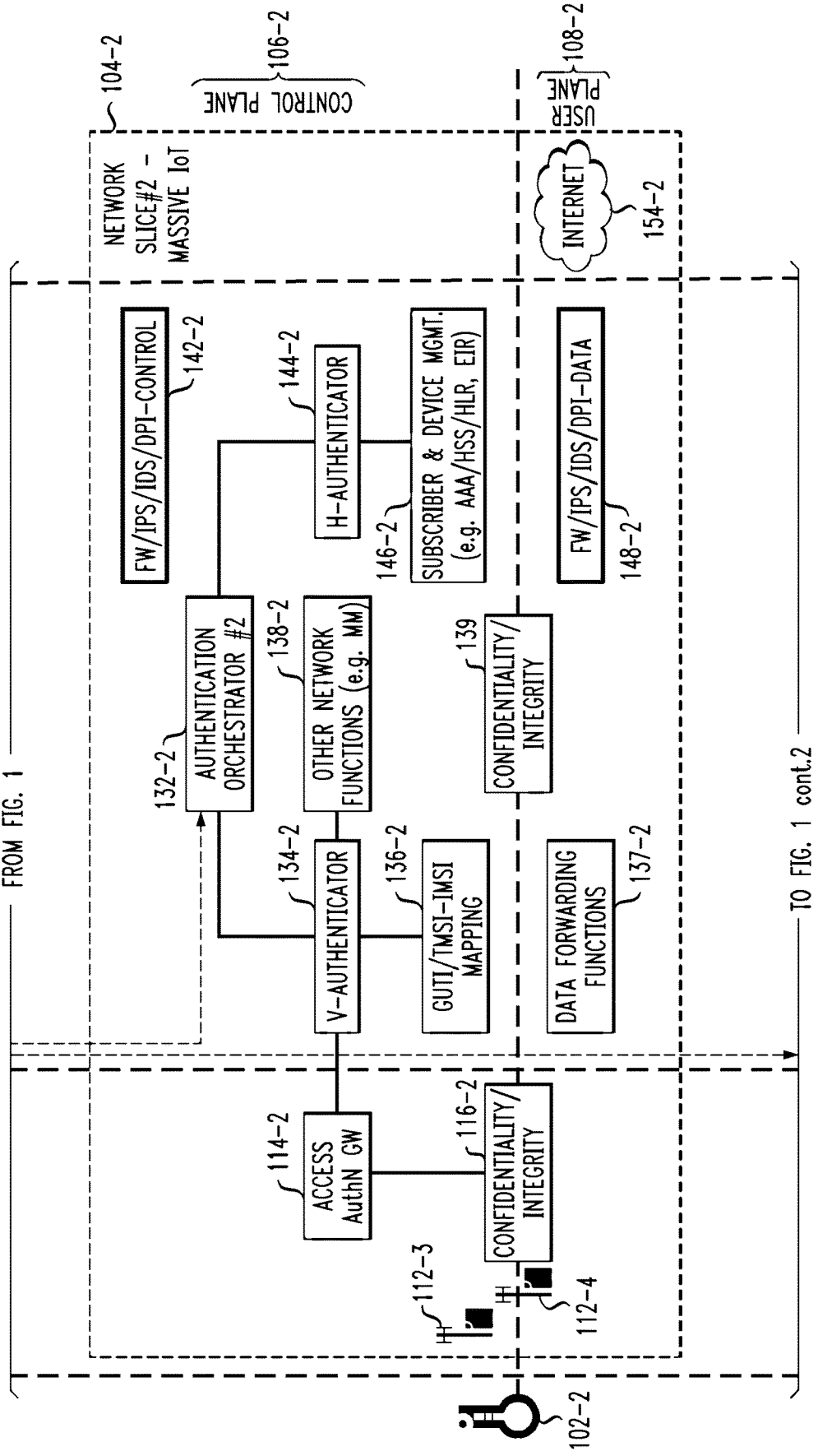
FIG. 1 cont.1

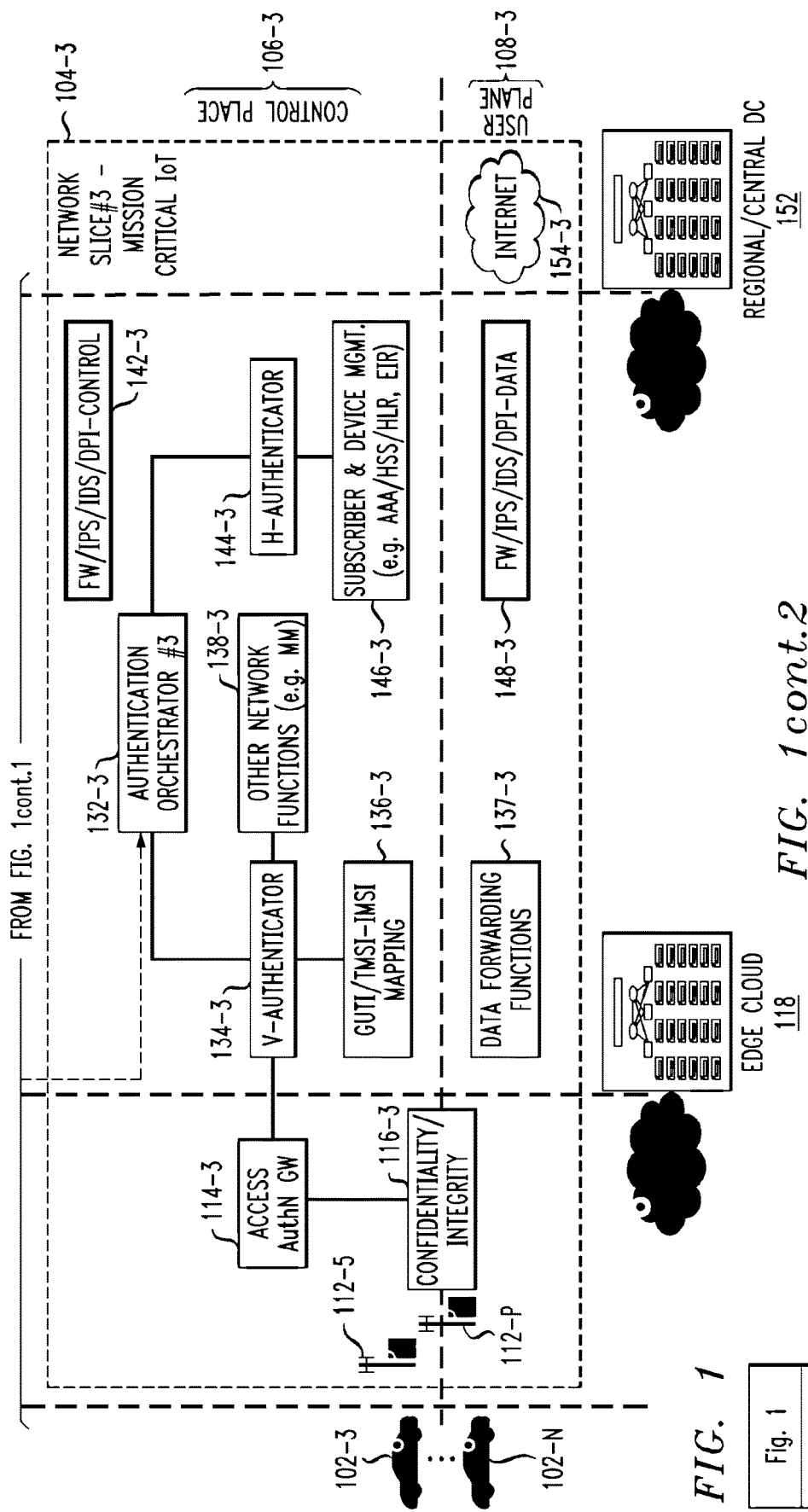

FIG. 2
200

| IDENTIFIER | AUTHENTICATION STATUS | AUTHENTICATION MECHANISM | ACTIVE AUTHENTICATION VECTORS/INFORMATION | RESERVED AUTHENTICATION VECTORS/INFORMATION | ADDRESS OF LEGACY AUTHENTICATOR | ... |
|---|---|---|---|---|---|---|
| IMSI#1 | SUCCESSFUL | EPS AKA | EPS AV | EPS AVs | | |
| IMSI#2 | SUCCESSFUL | UMTS AKA | UMTS AV | UMTS AVs | | |
| IMSI#3 | SUCCESSFUL | EPS AKA | N/A | N/A | MME ADDR. | |
| IMSI#4 | SUCCESSFUL | SSO | N/A | N/A | N/A | |
| ... | ... | ... | ... | ... | | |
| MAC#1 | SUCCESSFUL | WPA/WPAII | PMK | PMKs | | |
| ... | ... | ... | ... | ... | | |
| IMEI#1 | SUCCESSFUL | N/A | N/A | N/A | | |
| ... | ... | ... | ... | ... | | |

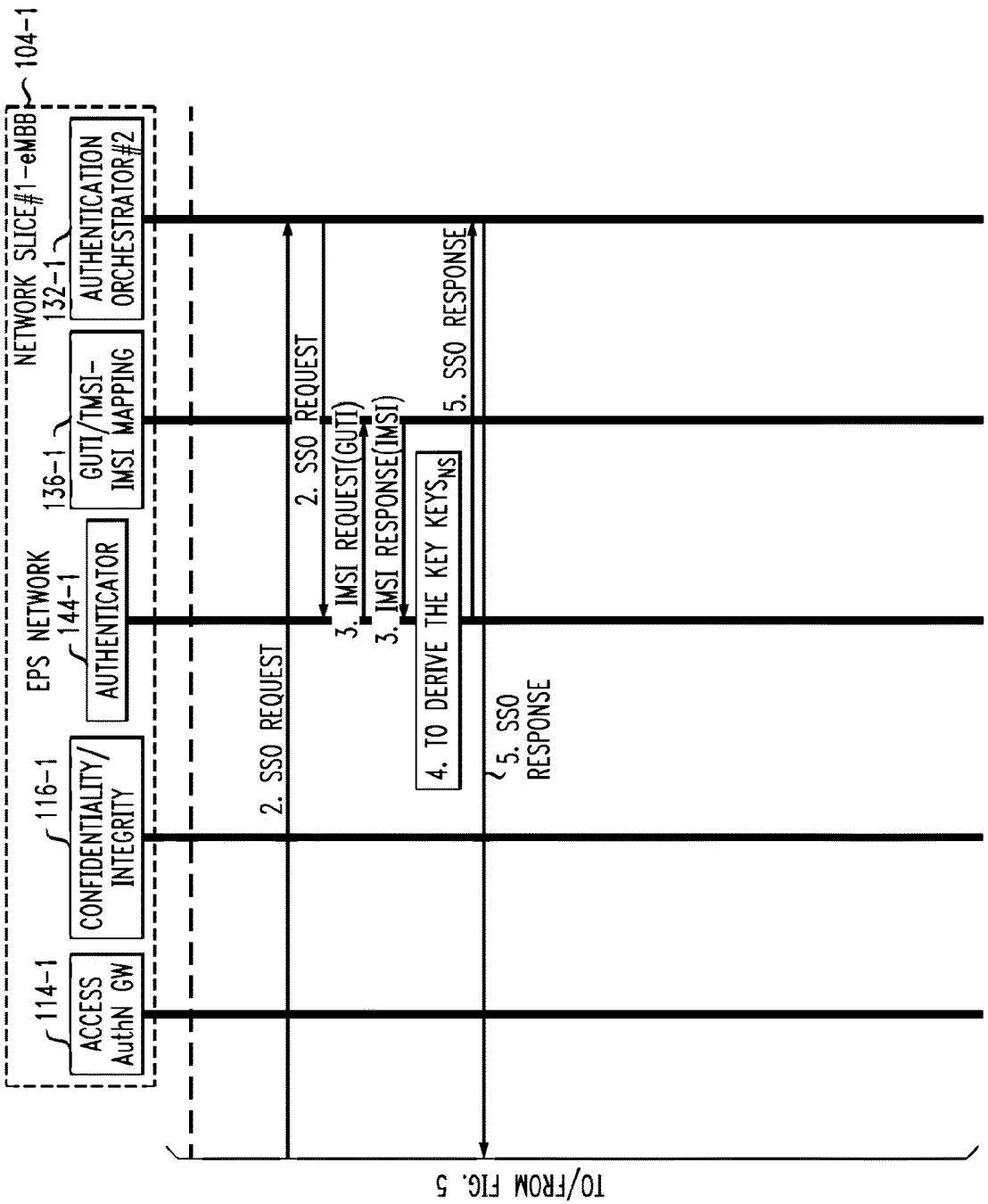

UNIFIED SECURITY ARCHITECTURE

CROSS-REFERENCE TO RELATED APPLICATIONS

This application is a national phase under 35 U.S.C. § 371 of PCT International Application No. PCT/CN2016/099206 which has an international filing date of Sep. 18, 2016, the entire contents of each of which are hereby incorporated by reference.

FIELD

The application relates generally to communication networks, and more particularly, but not exclusively, to security functions in communication networks.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, as governed by the International Telecommunications Union (ITU), was developed to provide high capacity mobile multimedia with high data rates particularly for human interaction. The next generation or fifth generation (5G) technology will be used not only for human interaction, but also for machine type communications. More than 70 use cases covering different 5G scenarios have been described in the Third Generation Partnership Project (3GPP) Technical Report (TR) 22.891, the disclosure of which is incorporated by reference herein in its entirety. A major difference between 4G and 5G design requirements is the diversity of use cases that 5G networks must support as compared to 4G networks that were primarily designed for the single use case of delivering high speed mobile broadband.

5G will enable very diverse use cases, as mentioned above. Each use case has different security requirements. For example, massive Internet of Things (IoT) applications with specifications for supporting massive numbers (e.g., about 1 million connections per square kilometer) of low capability devices (e.g. sensors, actuators and cameras) and ten plus years on battery life also require energy-efficient security solutions. Further, mission-critical IoT applications (e.g., industrial control systems, mobile health care, real-time control of vehicles, road traffic, accident prevention, wide area monitoring and control systems for smart grids, public safety communication systems, multimedia priority services, etc.) with low latency and high reliability devices require real-time adaptive and high-level security solutions. Still further, enhanced mobile broadband (eMBB) services with improved wireless Internet access specifications for mobile devices also require improved security solutions.

However, there are significant challenges in meeting the multiple and diverse security requirements associated with the multiple and diverse use cases supported in 5G and similar networks. Existing security solutions do not adequately address the significant challenges.

SUMMARY

Illustrative embodiments provide techniques for providing unified security functions and architecture in communication networks. While such embodiments may be expected to provide, for example, improvements in performance and/or reduction of cost of relative to conventional approaches, no particular result is a requirement of any embodiment unless explicitly recited in a particular claim.

For example, in one embodiment, a method includes the following steps. A security service function chain is created including a set of security service functions. The security service function chain is created in response to instantiation of a given network partition in a communication network. The communication network supports instantiation of a plurality of network partitions for providing a respective plurality of network services. The security service function chain is utilized to perform at least one security service for an entity performing one of accessing and seeking access to a network service corresponding to the given network partition.

In another embodiment, an article of manufacture is provided which comprises a processor-readable storage medium having encoded therein executable code of one or more software programs. The one or more software programs when executed by at least one processing device implement steps of the above-described method.

In yet another embodiment, an apparatus comprises a memory and a processor configured to perform steps of the above-described method.

Advantageously, illustrative embodiments provide unified security services functions (for example, but not limited to, authentication functions) and architecture to meet different security requirements for the multiple and diverse security requirements supported by 5G and similar networks (e.g., massive IoT, mission-critical IoT, eMBB, etc.), as well as to provide key negotiation and agreement for confidentiality and integrity protection, for an entity (e.g., a subscriber (using a device with a subscriber or user identity module) or a device (with no subscriber or user identity module)) accessing or seeking access to a network partition(s), a network service(s), and/or other portions of the communication network.

These and other features and advantages of embodiments described herein will become more apparent from the accompanying drawings and the following detailed description.

BRIEF DESCRIPTION OF THE DRAWINGS

FIG. 2 shows a table of authentication status and security context according to one embodiment.

DETAILED DESCRIPTION

Figure 1:
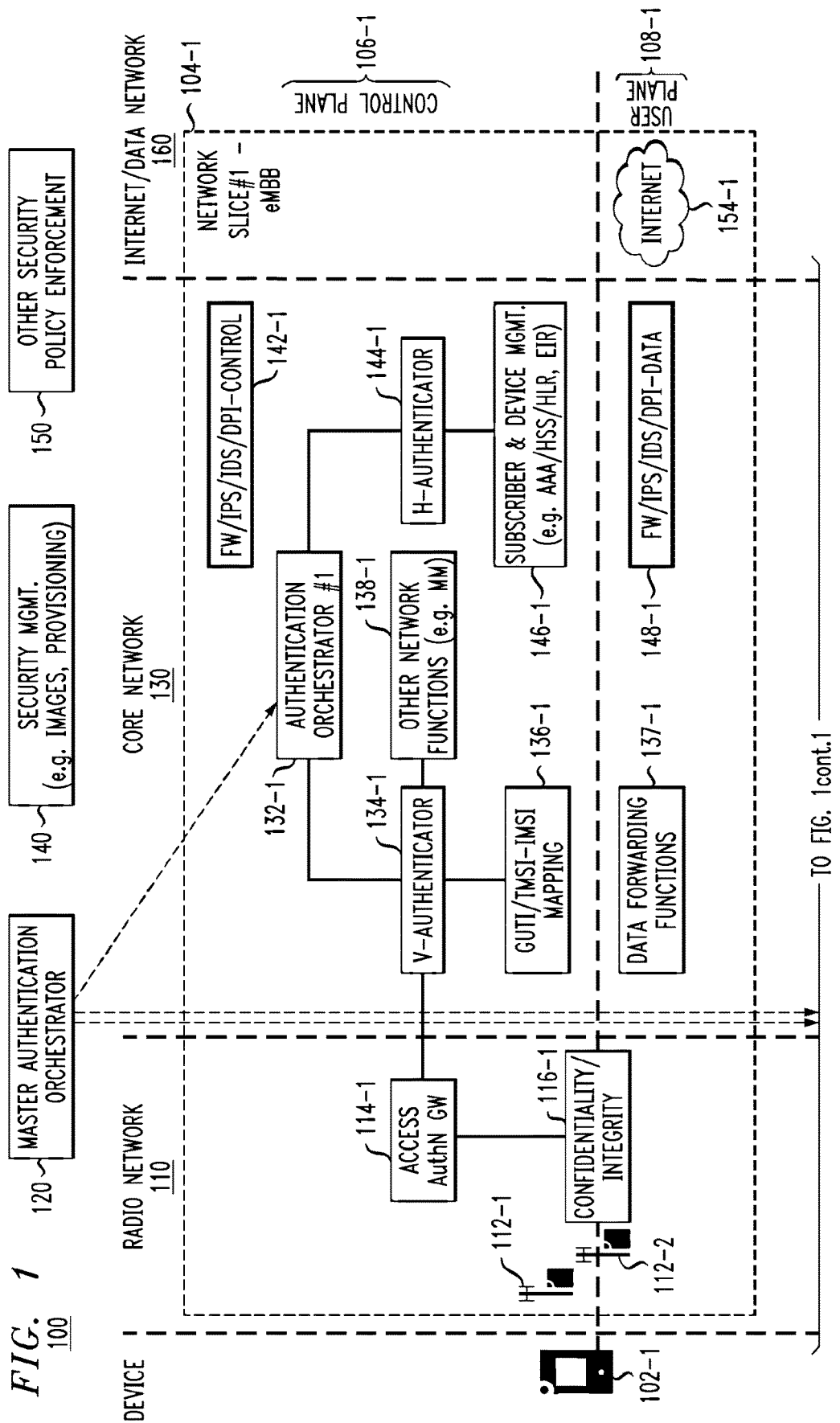
FIG. 1 shows a unified authentication architecture according to one embodiment.

Illustrative embodiments will be described herein with reference to exemplary computing systems, data storage systems, communication networks, processing platforms, systems, user devices, network nodes, network elements, clients, servers, and associated communication protocols. However, it should be understood that embodiments are not limited to use with the particular arrangements described, but are instead more generally applicable to any environment in which it is desirable to provide mechanisms and methodologies for improved security in a communication network.

While illustrative embodiments are described herein in the context of authentication functions, it is to be appreciated that alternative embodiments may be implemented with other security functions in a straightforward manner given the teachings provided herein.

In accordance with illustrative embodiments, some main design principles associated with a unified authentication architecture for a 5G or similar network are as follows:

i) Generally, there are three main types of 5G services/applications (use cases), i.e., eMBB, massive IoT and mission-critical IoT. Illustrative embodiments design a unified authentication architecture for these three types of 5G services/applications with different security requirements. However, the unified authentication architecture is scalable and can also be applied to other types of 5G services/applications (use cases), which may have different security requirements, in a straightforward manner.

ii) With the introduction of new technologies to 5G networks, such as software-defined networking (SDN) and network function virtualization (NFV), logical functions in the unified authentication architecture can be automatically deployed on-demand.

iii) The security function in the radio network (e.g., deployed with evolved Node B (eNodeB or eNB) in the same platform) can extract/separate authentication information from radio access request messages such as an attach request, compose authentication request messages, then forward them to the corresponding authentication functions.

iv) The authentication function has been integrated into a mobility management entity (MME) in 4G networks, a serving general packet radio service support node (SGSN) in 3G networks, and a mobile switching center/visitor location register (MSC/VLR) in 2G networks. In accordance with illustrative embodiments, the authentication function is separated from these network functions and deployed as a stand-alone and common function in a 5G network. Such separation and deployment can be achieved using NFV and SDN technologies. From an evolution point of view, the authentication function in a 5G network should be compatible with the authentication in 4G/3G/2G networks. The centralized authentication function according to illustrative embodiments can also simplify the authentication procedures for the mobility from 3GPP network system access to non-3GPP network system access. The authentication for the mobility from 3GPP system access to non-3GPP network system access, defined in 3GPP Technical Specifications (TS) 33.401 and TS33.234, the disclosures of which are incorporated by reference herein in their entireties, is very complicated and overloaded.

v) The function of Global Unique Temporary ID/Temporary Mobile Subscriber Identity-International Mobile Subscriber Identity (GUTI/TMSI-IMSI) mapping management has been integrated into MME in 4G networks, SGSN in 3G networks, and MSC/VLR in 2G networks. In accordance with illustrative embodiments, the GUTI/TMSI-IMSI mapping management function is separated from these network functions and deployed as a stand-alone and common function in a 5G network. Network functions such as authentication, mobile management and network resource management interact with the GUTI/TMSI-IMSI mapping management function to retrieve IMSI for further operations/actions (e.g., authentication, handover, network resource allocation).

According to the above and other design principles, a unified authentication architecture for a 5G or similar network is depicted in FIG. 1.

As shown, unified authentication architecture 100 is illustrated as logical functions (also referred to herein as functions, modules, and/or components) that are implemented across the various subnetworks of a 5G or similar network. The subnetworks comprise a Radio Network 110, a Core Network 130, and a Data Network (Internet) 160. The subnetworks 110, 130 and 160 are operatively coupled utilizing various communications protocols and network infrastructure, as will be further explained herein. For example, as architecture 100 further illustrates, the Radio Network 110 resides between the mobile user devices 102-1, 102-2, 102-3, . . . , 102-N and an Edge Cloud Network 118. Note that the mobile user devices are depicted in FIG. 1 as various communication devices such as, but not limited to, smart phones (e.g., 102-1), IoT sensors and machines (e.g., 102-2), and vehicles (e.g., 102-3 . . . 102-N). Further, the Core Network 130 resides between the edge cloud network 118 and a regional or central data center (DC) 152.

It is also to be noted that the various subnetworks that make up the 5G network are partitioned into "network slices." Network slices (network partitions) comprise a series of function sets (i.e., function chains) for each corresponding service type using NFV on a common physical infrastructure. The network slices are instantiated as needed for a given service. As used herein and in the claims, instantiation is defined as "creating an instance." A network slice or function is thus instantiated when an instance of that network slice or function is created. In some embodiments, this involves installing or otherwise running the network slice or function on one or more host devices of the underlying physical infrastructure.

As shown in FIG. 1, there are three network slices: network slice #1 (104-1) corresponding to an eMBB service; network slice #2 (104-2) corresponding to a massive IoT service; and network slice #3 (104-3) corresponding to a mission-critical IoT service. Each network slice has a control plane and a user plane (Control Plane 106-1 and User Plane 108-1 for network slice #1; Control Plane 106-2 and User Plane 108-2 for network slice #2; and Control Plane 106-3 and user plane 108-3 for network slice #3). Each network slice provides the desired function sets to enable a mobile user device (102-1, 102-2, 102-3, . . . , 102-N) to communicate with a data network (Internet 154-1 for network slice #1, Internet 154-2 for network slice #2, and Internet 154-3 for network slice #3).

As further shown in architecture 100, each part of a network slice in the Radio Network 110 comprises access points (base stations) 112-1, 112-2, 112, 3, 112-4, 112-5, . . . , 112-P, and logical functions including: an Authentication Gateway (Access AuthN GW) function 114 (114-1 for network slice #1, 114-2 for network slice #2, and 114-3 for network slice #3); and a Confidentiality/Integrity function 116 (116-1 for network slice #1, 116-2 for network slice #2, and 116-3 for network slice #3).

Still further, each part of a network slice in the Core Network 130 comprises logical functions including: an Authentication Orchestrator 132 (132-1 for network slice #1, 132-2 for network slice #2, and 132-3 for network slice #3); a Visited Network Authenticator or V-Authenticator 134

(134-1 for network slice #1, 134-2 for network slice #2, and 134-3 for network slice #3); a GUTI/TMSI-IMSI Mapping Management function 136 (136-1 for network slice #1, 136-2 for network slice #2, and 136-3 for network slice #3); a Data Forwarding Function 137 (137-1 for network slice #1, 137-2 for network slice #2, and 137-3 for network slice #3), Other Network functions 138 (e.g., such as, but not limited to, Mobility Management; 138-1 for network slice #1, 138-2 for network slice #2, and 138-3 for network slice #3); a Confidentiality/Integrity function 139 (network slice #2 only); a Home Network Authenticator or H-Authenticator 144 (144-1 for network slice #1, 144-2 for network slice #2, and 144-3 for network slice #3); and Subscriber and Device Management functions 146 (such as, but not limited to, Authentication, Authorization and Accounting (AAA) service, Home Subscriber service (HSS), Home Location Register (HLR), and Equipment Identity Register (EIR); 146-1 for network slice #1, 146-2 for network slice #2, and 146-3 for network slice #3).

Unified authentication architecture 100 also comprises Master Authentication Orchestrator 120, deployed in the Core Network 130, which manages network-slice Authentication Orchestrator functions 132-1, 132-2, and 132-3, as will be described in greater detail herein. Security Management function 140 is also part of architecture 100 and provides management of images and provisioning functions as they pertain to security issues. The term "images" as used here illustratively refers to images of virtualized security functions. When necessary, selected images are retrieved from an image repository, encrypted, and transported to a remote site or host and instantiated to provide security service functions.

It is to be appreciated that the 5G security system is comprehensive. The illustrative embodiment of FIG. 1 depicts wireless network access authentication. So, other security functions such as Firewall/Intrusion Prevention Systems/Intrusion Detection Systems/Deep Packet Inspection (FW/IPS/IDS/DPI) shown in FIG. 1 respectively as modules 142-1, 142-2, 142-3, 148-1, 148-2, 148-3, and 150 will be not explained in detail herein. These functions are described in other corresponding 5G security standards, and are not the focus of illustrative embodiments.

Accordingly, as illustratively depicted in architecture 100 in FIG. 1, authentication-related logical functions are deployed for 5G services/applications in corresponding network slices, i.e., network slice #1 (eMBB), network slice #2 (massive IoT), and network slice #3 (mission-critical IoT). Note that the authentication-related logical functions may have different deployments. For example, in network slice #2 for massive IoT, the functions Confidentiality/Integrity 139 is deployed in the Core Network 130 (as compared to the Radio Network 110 for network slices #1 and #3) as User Plane data may be carried in signaling messages. By way of further example, in network slice #3 for mission-critical IoT, the functions V-Authenticator 134-3 and GUTI/TMSI-IMSI mapping 136-3 maybe deployed in the Radio Network 110 or close to the Radio Network 110, e.g., in edge cloud 118 (as shown), in order to reduce the latency.

Given the above-described architecture 100 in FIG. 1, the main logical functions of the architecture will now be further described in detail.

Master Authentication Orchestrator 120.

This logical function operates across network slices and is deployed in the Core Network 130. Further, master Authentication Orchestrator 120 is provisioned with the addresses of Authentication Orchestrators in network slices to be managed, i.e., network-slice Authentication Orchestrator 132-1, network-slice Authentication Orchestrator 132-2, and network slice Authentication Orchestrator 132-3.

The master Authentication Orchestrator 120 provides an authentication topology view of the 5G network by interacting with the network slice Authentication Orchestrators 132-1, 132-2, and 132-3 and obtaining authentication status. Further, as mentioned, master Authentication Orchestrator 120 manages the network-slice Authentication Orchestrators 132-1, 132-2, and 132-3. Such management comprises: launching a new instantiation of a network-slice Authentication Orchestrator, for example, when a new network slice is created; stopping an existing instantiation of a network-slice Authentication Orchestrator, for example, when a network slice stops providing services; and providing software upgrades for network-slice Authentication Orchestrators.

Still further, the master Authentication Orchestrator 120 provides single sign-on (SSO) services across network slices. SSO service is important for the same mobile device to access several services/applications deployed in different network slices or for one device to access one service/application across different network slices. As for SSO services across network slices, compliance requirements may include, but are not limited to, complying with mobile network operator's (MNO) policies. For example, some MNOs permit SSO services within their own network domains or across MNO network domains, but some MNOs do not. Another compliance requirement includes complying with polices of network slices and services/applications. For example, massive IoT services/applications permit SSO, but mission-critical IoT services/applications may not permit SSO. Yet another compliance requirement includes complying with security policies. For example, mission-critical IoT services/applications with high-level security cannot accept the authentication result from massive IoT services/applications with low-level security.

Access AuthN GW 114.

An access authentication gateway is provisioned in each network slice (as shown in FIG. 1, 114-1 for network slice #1, 114-2 for network slice #2, and 114-3 for network slice #3). This logical function is deployed in the Radio Network 110, and provisioned with the addresses of the V-Authenticator 134, H-Authenticator 144, and Confidentiality/Integrity function 116 to be connected in its corresponding network slice. The Access AuthN GW function recognizes to which network slice authentication messages received from mobile devices 102 (via access points 112) will be sent.

Further, the Access AuthN GW function 114 extracts/separates authentication information from radio access request messages such as, for example, attach request, composes authentication request messages, then forwards them to the corresponding V-Authenticator 134. Access AuthN GW also receives authentication-related messages (e.g., user authentication request) from the V-Authenticator 134, integrates/converges authentication information into radio access response messages to be forwarded to the devices 102. The Access AuthN GW 114 further obtains the keys and the corresponding indicator of cryptographic algorithms obtained from the authentication procedures, then forwards them to the Confidentiality/Integrity function 116.

Network Slice Authentication Orchestrator 132.

A network slice Authentication Orchestrator is provisioned in each network slice (as shown in FIG. 1, 132-1 for network slice #1, 132-2 for network slice #2, and 132-3 for network slice #3). This logical function is deployed in the Core Network 130, and provisioned with the addresses of the V-Authenticator 134 and the H-Authenticator 144 in its corresponding network slice. The network slice Authentication Orchestrator provides an authentication topology view of the network slice, and can manage Authenticators (134 and 144) in the same network slice. Such management includes, but is not limited to: launching a new instantiation of an Authenticator, for example, for a network slice to be scaled out (sometimes referred to as a scale-out operation); stopping an existing instantiation of an Authenticator, for example, for a network slice to be scaled in (sometimes referred to as a scale-in operation); and providing provision, configuration and software upgrades for authenticators.

The network slice Authentication Orchestrator 132 also supports authentication for roaming scenarios when the V-Authenticator 134 does not know the address of the H-Authenticator 144 (in some cases such as, e.g., the network slice was just launched/installed/instantiated, H-Authenticator was just launched/installed/instantiated, V-Authenticator was just launched/installed/instantiated or not provisioned, etc.). For example, the V-Authenticator 134 retrieves the address of the H-Authenticator 144 from the Authentication Orchestrator 132 then further sends an authentication request to the home domain network in order to retrieve authentication information through the H-Authenticator 144. The Authentication Orchestrator 132 also optimizes authentication procedures during handover. For example, the centralized function knows all subscribers/devices authentication status so that it can simplify authentication and key agreement procedures during handover, especially for the mobility from 3GPP wireless system access to non-3GPP wireless system access.

V/H-Authenticator 134/144.

The authenticator, with the same role of authentication and key agreement which has been integrated into MME in 4G networks, SGSN in 3G networks, and MSC/VLR in 2G networks, is separated from network functions and deployed as a stand-alone and common function in 5G networks in accordance with illustrative embodiments. The Authenticator logical function can be deployed in either the Radio Network 110 or the Core Network 130 depending on the demands of network slices. The Authenticator is provisioned with the addresses of the network-slice Authentication Orchestrator, the Access AuthN GW, the GUTI/TMSI-IMSI mapping, and the other common network functions (e.g., mobile management) in the corresponding network slice. Note that the functions of the Authenticator, as described herein in this section, generally refer to the Authenticator logical function without regard to the home domain/visited domain. When consideration of the visited and home domains come into the process below, the Authenticator logical function will be described as V-Authenticator and H-Authenticator, respectively.

The unified authentication architecture 100 is compatible with legacy authentication architectures. For example, a subscriber authenticated by a legacy network (e.g., Universal Mobile Telecommunications System (UMTS) or Evolved Packet System (EPS)) plans to handover from the legacy network to the 5G network. As such, the authenticator function (134/144) is configured to retrieve authentication information (e.g., authentication vectors (AVs), pairwise master keys (PMKs)) from the network equipment (e.g., SGSN or MME or Authentication, Authorization and Accounting (AAA) server) in the legacy network.

The Authenticator logical function supports existing authentication mechanisms such as UMTS Authentication and Key Agreement (AKA), EPS_AKA, and Wireless Fidelity (Wi-Fi) Protected Access/Wi-Fi Protected Access II (WPA/WPA2) (for Wi-Fi) as well as new authentication mechanisms to be used for 5G or future wireless networks. A flag such as "UMTS_AKA", "EPS_AKA", "WPA" and "5G_Authentication" (i.e., new authentication mechanism for 5G) is used to identify which authentication mechanisms are to be used. Based on the radio access technology (e.g., Universal Terrestrial Radio Access Network (UTRAN), Long Term Evolution (LTE), Wi-Fi) and device security capabilities (e.g., authentication mechanism, cryptographic algorithms) provided by the device 102, the authenticator decides which authentication mechanism(s) will be used for wireless access authentication.

The Authenticator retrieves the actual/real identity (e.g., IMSI) of the subscriber based on the temporary identity (e.g., TMSI, GUTI). In a 3GPP network system, actual/real identity of the subscriber is not sent through the network in order to protect subscriber's privacy. In order to perform subscriber authentication, the Authenticator contacts the GUTI/TMSI-IMSI mapping function to fetch the subscriber's actual/real identity.

When a subscriber registers on the 3GPP network, a temporary identity is assigned (by the authenticator or by other common network functions) to the subscriber after mutual authentication between the subscriber and the network is successfully performed. The mapping relationship between the temporary identity and actual/real identity for the subscriber is stored by the GUTI/TMSI-IMSI mapping function.

When a subscriber roams to a visited domain network and the Authenticator in the visited domain network (i.e., V-Authenticator 134) has no valid authentication information (e.g., AVs, PMKs) for the subscriber, V-Authenticator 134 contacts H-Authenticator 144 (with the help of the network-slice authentication orchestrator 132 if V-Authenticator 134 does not know the address of H-Authenticator 144, e.g., in some cases such as the network slice was just launched/installed/instantiated, H-Authenticator was just launched/installed/instantiated, V-Authenticator was just launched/installed/instantiated or not provisioned, etc.) to get authentication information in the home domain network (i.e., H-Authenticator 144).

When a subscriber accesses the wireless network and the Authenticator has no valid authentication information (e.g., authentication vectors, PMKs) for the subscriber, the authenticator contacts the Subscriber and Device Management function 146 to fetch corresponding authentication information.

Illustrative embodiments provide management of authentication status and security context for subscribers and/or devices in order to optimize authentication/re-authentication procedures. FIG. 2 shows an authentication status table 200 according to one embodiment. As shown, for example for a subscriber uniquely identified by IMSI #1, the table 200 stores the following information: authentication status (successful); authentication mechanism (EPS AKA); active authentication vectors/information (EPS AV) (i.e. security context); reserved authentication vectors/information (EPS AVs) (i.e. security context); and address of legacy authenticator (none). Similar status information is stored for devices uniquely identified by their IMEIs or network interfaces uniquely identified by their MAC addresses, as shown further shown in table 200. It is to be understood that there may be one or more such tables to record authentication status for subscribers, devices, and/or network interfaces. These one or more tables are stored in the authenticator (function 134, 144, or some combination thereof).

Illustrative embodiments also optimize authentication procedures during handover. The Authenticator records subscribers/devices authentication status and security context so that the procedures of authentication and key agreement during handover are simplified, especially for the mobility from 3GPP wireless system access to non-3GPP wireless system access. In 3GPP TS33.402 and TS23.402, the disclosures of which are incorporated by reference herein in their entireties, even though user equipment (UE) has already been authenticated by the source radio access network, mutual authentication between UE and the target network has to be done again in order to obtain the keys used to protect the air link before handover. In this way, authentication communications over the air link is overloaded and handover latency is increased. Advantageously, in accordance with illustrative embodiments, there is no need to do mutual authentication between UE and the target network again since the Authenticator knows the authentication status and security context.

The Authenticator notifies the other common network functions (e.g., mobile management) that the authentication is successful or failed. If authentication is successful, the network resource allocation goes on to further steps, otherwise it is stopped.

GUTI/TMSI-IMSI Mapping 136.

The function of GUTI/TMSI-IMSI mapping management, with the role of managing the relationship between the temporary identity and IMSI (which has been integrated into MME in 4G, SGSN in 3G, and MSC/VLR in 2G) is separated from network functions and deployed as a standalone and common function in 5G networks in accordance with illustrative embodiments. A hierarchy of consolidated mapping tables is employed, in one embodiment, to manage the relationship between temporary identity and IMSI, e.g., the mapping relationship between GUTI and IMSI, and between TMSI and IMSI, etc. Such tables are stored in the mapping component 136.

Subscriber and Device Management 146.

For a commercial network, subscriber and device management is typically deployed separately from each other. However, in order to simplify the description, subscriber and device management are described together and depicted as one function in FIG. 1.

Subscriber management may be implemented as one existing subscriber management system such as a Home Location Register/Home Subscriber Server (HLR/HSS) and an AAA Server, the combination of these existing subscriber management systems, or a new subscriber management system. Device management may be implemented as one existing device management system such as Equipment Identity Register (EIR) and Open Mobile Alliance (OMA) Device Management (DM) system, the combination of these existing device management systems, or a new device management system.

Confidentiality/Integrity 116/139.

The Confidentiality/Integrity logical function, with the same role of providing confidentiality and integrity protection which is integrated into a Radio Network Controller (RNC) or eNB (confidentiality and integrity protection for wireless communication), and MME (confidentiality and integrity protection for non-access stratum (NAS) messages), can be deployed in either the Radio Network 110 or the Core Network 130 depending on the demands of services/applications. The logical function is provisioned with the address of the Access AuthN GW function 114 for its corresponding network slice.

The Confidentiality/Integrity logical function obtains the keys and the corresponding indicator of cryptographic algorithms from the Access AuthN GW function, and then performs confidentiality and integrity protection for signaling messages on the Control Plane 106 and user data on the User Plane 108 according to the requirements from services/applications.

Security Management 140.

The Security Management logical function is a component deployed in the Core Network 130. The function provides for, across network slices, image management, security provisioning, and software updates for all authentication-related functions.

Given the above detailed description of the various logical functions (functions, modules, and/or components) of unified authentication architecture 100, the following detailed description illustrates network access authentication for three scenarios in a 5G network. In order to simplify the description, the following non-limiting assumptions are made:

1—Only authentication procedures are described.
2—The communication between any two logical functions is secured by transport layer security/Internet Protocol security (TLS/IPsec) or physical security.
3—The logical functions Access AuthN GW and Confidentiality/Integrity are deployed in the same platform with a wireless access node (e.g., Evolved Universal Terrestrial Radio Access Network (E-UTRAN) access node, Wireless Local Area Network (WLAN) access node).
4—For the handover from E-UTRAN to WLAN: (a) WLAN access node and E-UTRAN access node are trusted by each other as defined in 3GPP TS23.402; (b) handover between EPS E-UTRAN and WLAN is in a single-connect mode with non-roaming.

Figure 3:
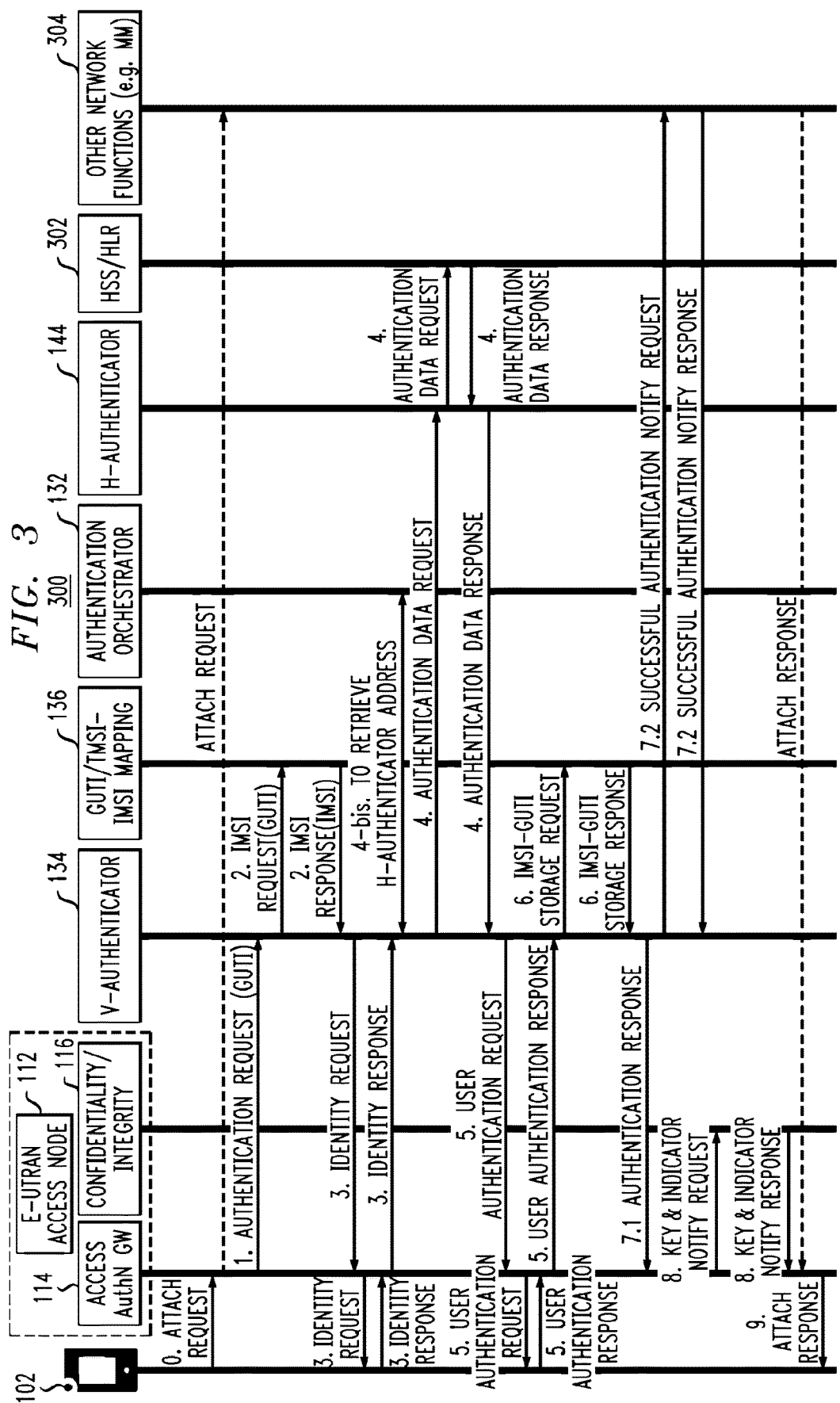
FIG. 3 shows an authentication methodology for an attach request initiated from a visited domain network according to one embodiment.

FIG. 3 shows an authentication methodology 300 for an attach request initiated from a visited domain network according to one embodiment. Authentication methodology 300 assumes that one user initiates the Attach Request from a visited EPS network while there is no mapping relationship between GUTI and IMSI for this user in the visited EPS network. Thus, the visited EPS network has to retrieve authentication information from the home EPS network. For this scenario, it is also assumed that a new network slice is instantiated and no authentication for roaming access is previously performed. It is further assumed that a new instance of H-Authenticator is installed and starts to operate and V-Authenticator 134 does not know the address of H-Authenticator 144.

When a new network slice is created, the network-slice authentication orchestrator 132 chooses the instances of Access AuthN GW 114, Confidentiality/Integrity 116, V-Authenticator 134, GUTI/TMSI-IMSI mapping management 136, and H-Authenticator 144 (with HSS/HLR 302), and then creates a function chain (together with other network functions 304 such as, but not limited to, Mobility Management Function (MMF) or Core Control Function (CCF) in Next Generation Network Architecture S2-165374, the disclosure of which is incorporated by reference herein in its entirety) for access authentication.

Following creation of the above-described function chain, authentication methodology 300 is performed. Note that the enumerated steps described below correspond to the steps labeled in FIG. 3.

Step 0: The end user turns on his mobile phone (device 102) in a visited EPS network after, for example, a long-haul flight. The user equipment (UE) of the mobile device sends the message Attach Request to the visited E-UTRAN access node 112 (comprised of Access AuthN GW function 114 and Confidentiality/Integrity function 116).

Step 1: The Access AuthN GW function 114 (deployed in visited E-UTRAN access node 112) extracts authentication-related information (e.g., UE security capability, GUTI, etc.) from the Attach Request and composes a message, i.e., Authentication Request (GUTI, "EPS_AKA", UE other security capability, etc.) Note that it is assumed that GUTI was obtained in the last connection to a 3GPP network, while EPS_AKA is a field for the Authenticator function (134/144) to know which authentication mechanism is used for the user. Then, the Access AuthN GW function 114 forwards an Authentication Request to the V-Authenticator function 134. Note also that other functions in the visited E-UTRAN access node 112 compose other messages such as, but not limited to, radio resource allocation messages, and then forwards them to corresponding network functions such as, but not limited to, mobility management. However, these additional messages are not a main focus here and will not be further described.

Step 2: The V-Authenticator function 134 receives the message Authentication Request and identifies the authentication mechanism for this user as EPS_AKA. The V-Authenticator function sends the message IMSI Request (GUTI) to the GUTI/TMSI-IMSI Mapping function 136 to retrieve the IMSI of the user. However, there is no valid mapping relationship between GUTI and IMSI for this user in the visited EPS network. So, the IMSI request fails to retrieve the IMSI of the user in visited EPS network.

Step 3: The V-Authenticator function 134 sends the message Identity Request to the UE (of device 102) through the Access AuthN GW function 114. The UE responds to the V-Authenticator function through the Access AuthN GW function with the IMSI. The messages Identity Request/Response are defined in 3GPP TS 33.401.

Step 4bis: The V-Authenticator function 134 retrieves the address of the H-Authenticator function 144 from the Authentication Orchestrator function 132.

Step 4: Based on the IMSI of this user, the V-Authenticator function 134 retrieves authentication data from the home EPS network through the H-Authenticator function 144 and the HSS/HLR 302. The messages Authentication Data Request/Response are defined in 3GPP TS33.401.

Step 5: The V-Authenticator function 134 sends the message User Authentication Request to the UE through the Access AuthN GW function 114. The UE generates corresponding keys and authentication data which are defined in 3GPP TS33.401. The UE responds to the V-Authenticator function 134 through the Access AuthN GW function 114 with a "RES" message. The V-Authenticator function 134 authenticates the user. The messages User Authentication Request/Response are defined in 3GPP TS33.401.

Step 6: The V-Authenticator function 134 stores the authentication status and security context and assigns a temporary identity GUTI for this user. It is possible for other network functions 304 to assign GUTI for this user. In this case, the V-Authenticator function 134 notifies the corresponding network function to assign a GUTI for this user. The GUTI-IMSI mapping relationship is kept in the GUTI/TMSI-IMSI Mapping function 136 through the messages IMSI-GUTI storage request/response.

Step 7: The V-Authenticator function 134 responds to the Access AuthN GW function 114 that the authentication of the user is successful by sending the message Authentication Response (sub-step 7.1). The V-Authenticator function 134 notifies other network functions 304 (e.g., mobility management) that the authentication of the user is successful, and the Other Network functions 304 respond (sub-steps 7.2). The other network functions can go further to allocate network resource for this user.

Step 8: The Access AuthN GW function 114 sends keys and related indicators from V-Authenticator function to the Confidentiality/Integrity function 116 through the messages Key & Indicator Notify request/response.

Step 9: The UE receives an Attach Response message from the network side.

Figure 4:
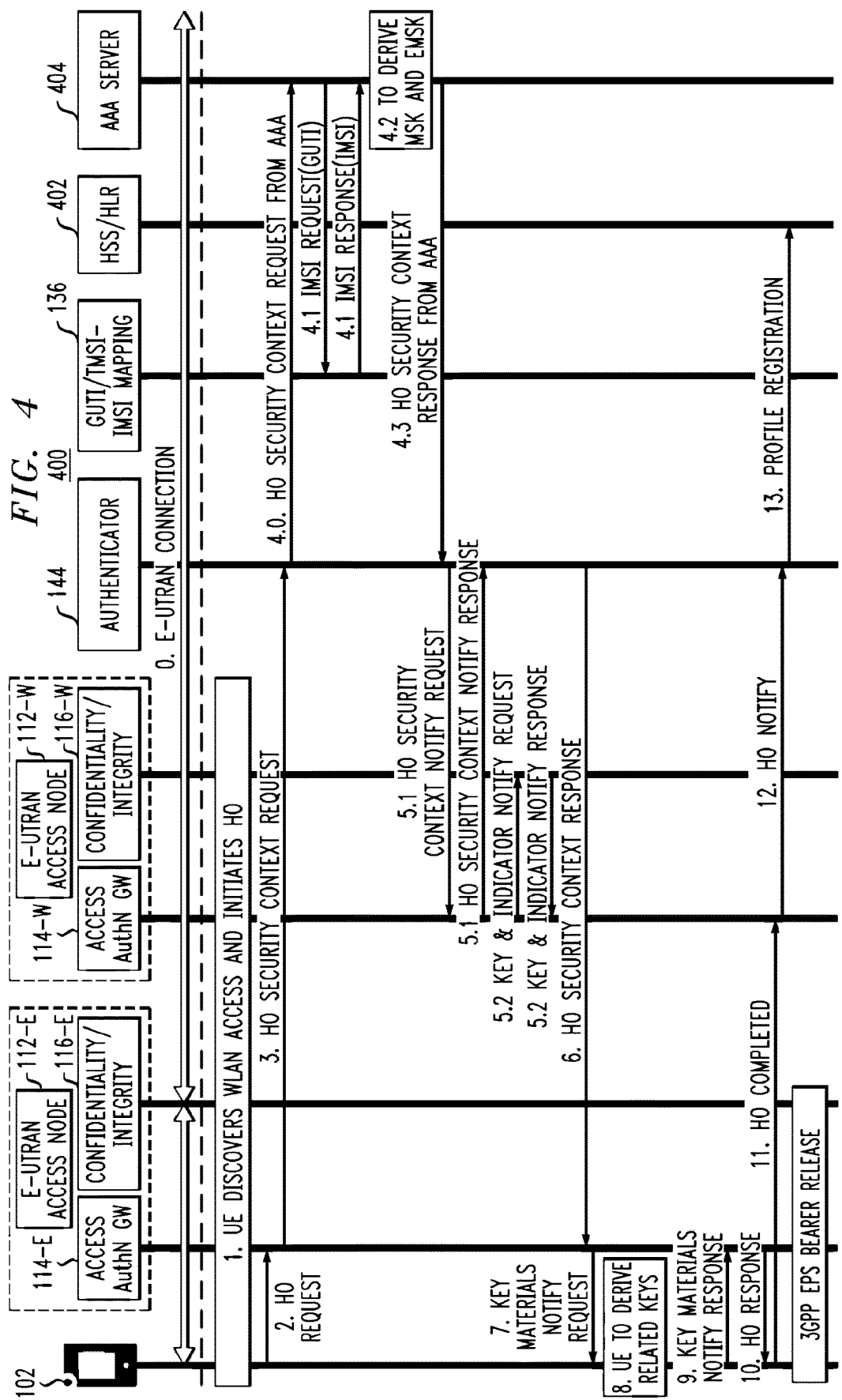
FIG. 4 shows an authentication methodology for mobility from 3GPP system access to non-3GPP system access according to one embodiment.

FIG. 4 shows an authentication methodology 400 for the mobility from 3GPP system access to non-3GPP system access according to one embodiment. Methodology 400 illustrates the authentication procedure for one user handover from a 3GPP EPS network to a WLAN network with the following two assumptions: (a) the WLAN access node and the E-UTRAN access node are trusted by each other as defined in 3GPP TS23.402; and (b) handover between EPS E-UTRAN and WLAN is in a single-connect mode with non-roaming status.

Following creation of the function chain depicted across the top of FIG. 4, authentication methodology 400 is performed. Note that the enumerated steps described below correspond to the steps labeled in FIG. 4.

Step 0. The UE (of device 102) is connected to the 3GPP EPS network via access node 112-E (comprised of Access AuthN GW function 114-E and Confidentiality/Integrity function 116-E).

Step 1. The UE discovers WLAN access node 112-W (comprised of Access AuthN GW function 114-W and Confidentiality/Integrity function 116-W). The UE initiates a handover request.

Step 2. The UE sends the message HO Request (Identity, Network Access Identifier Wireless Local Area Network $NAI_{WLAN}$) to the E-UTRAN access node 112-E. Note that parameters Identity and NAI are defined in 3GPP TS23.402 and 3GPP TS33.402. The Access AuthN GW function 114-E (deployed in E-UTRAN access node) extracts authentication-related information (e.g., Identity, $NAI_{WLAN}$, UE security capability) from the message HO Request and composes a message, i.e., HO Security Context Request (Identity, $NAI_{WLAN}$, UE security capability).

Step 3. The Access AuthN GW function 114-E sends the message Handoff (HO) Security Context Request to the Authenticator function. Here, the Authenticator function will be referred to as 144 (i.e., H-Authenticator function 144), although it is to be understood that, in alternative embodiments, the Authenticator function could be the V-Authenticator 134 when there is roaming authentication needed.

Step 4. After receiving the message HO Security Context Request, the Authenticator function 144 forwards HO Security Context Request to AAA Server 404 (sub-step 4.0). AAA Server 404 retrieves the IMSI from the GUTI/TMSI-IMSI Mapping function 136 (sub-step 4.1). Then, the AAA Server 404 retrieves the present EPS AV (authentication vector) in use according to the IMSI from its authentication status database (e.g., table 200 in FIG. 2). The AAA Server 404 derives a Master Session Key (MSK) and an Extended Master Session Key (EMSK) from a Key Access Management Entity ($K_{ASME}$) and stores them (with identity, authentication mechanism) into its authentication status database (sub-step 4.2). AAA Server 404 forwards a security context (e.g., Identity, MSK, EMSK) to the Authenticator function 144 (sub-step 4.3).

Step 5. The Authenticator function 144 sends a security context (e.g., Identity, MSK, EMSK) to the Access AuthN GW function 114-W deployed in the WLAN access node 112-W through the messages HO Security Context Notify Request/Response (sub-step 5.1). The Access AuthN GW function 114-W derives the keys to secure WLAN wireless access from the keys MSK and EMSK and stores them into its database, and then sends the keys and related indicators to the Confidentiality/Integrity function 116-W to secure WLAN wireless access through the messages Key & Indicator Notify request/response (sub-step 5.2).

Step 6. The Authenticator function 144 sends the message HO Security Context Response (Key Set Identifier Access Security Management Entity or $KSI_{ASME}$) to the Access AuthN GW function 114-E in the E-UTRAN access node 112-E.

Step 7. The Access AuthN GW function 114-E in E-UTRAN access node 112-E sends the message Key Materials Notify Request ($KSI_{ASME}$) to the UE.

Step 8. After receiving the message Key Materials Notify Request ($KSI_{ASME}$), the UE derives MSK and EMSK from $K_{ASME}$, and then derives the keys to secure WLAN access from MSK and EMSK.

Step 9. The UE sends the message Key Materials Notify Response to the Access AuthN GW function 14-E in the E-UTRAN access node 112-E.

Step 10. The UE receives the message HO Response from the network side.

Step 11. The UE sends the message HO completed to the Access AuthN GW function 114-W in the WLAN access node 112-W.

Step 12. WLAN access node sends the message HO Notify to the function Authenticator to record the authentication status.

Step 13. The Authenticator function 144 initiates the message Subscriber Profile Retrieval and registration to the HSS/HLR 402.

Radio access resources are released in the EPS E-UTRAN access node 112-E once the device 102 is successfully handed over to the WLAN access node 112-W.

Comparing authentication methodology 400 to the authentication procedure of a handover from a 3GPP system to a non-3GPP system defined in 3GPP TS33.402 and TS23.402, advantageous differences include, but are not limited to:
1—There is no mutual authentication between the UE and target network (i.e., WLAN access node).
2—The number of steps for key negotiation through the air link in methodology 400 is smaller than that defined in in 3GPP TS33.402 and TS23.402.

In this way, handover latency is reduced and scarce radio access resources are saved.

Figure 5:
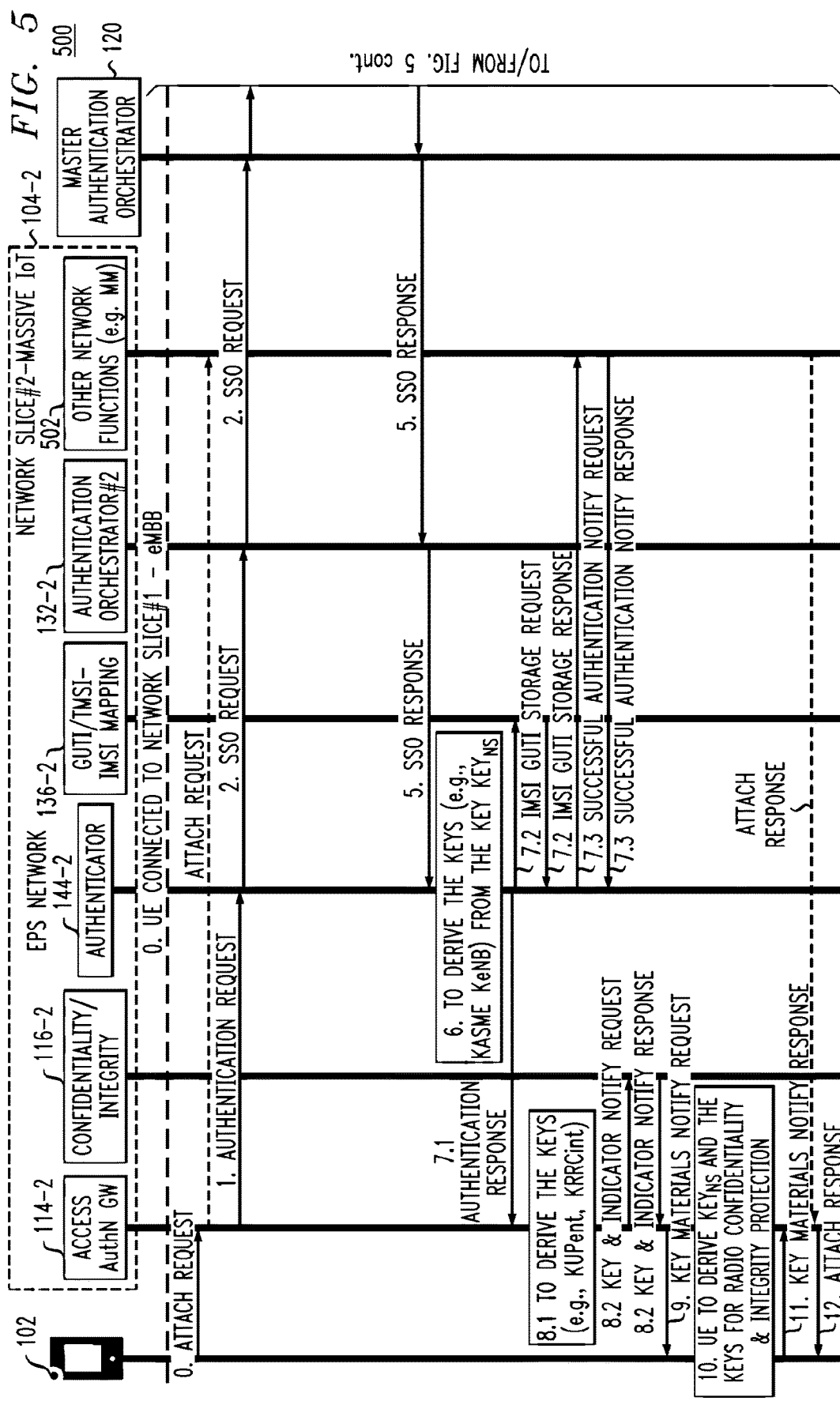
FIG. 5 shows a single sign-on methodology for user equipment to access multiple applications respectively provided by multiple network slices according to one embodiment.

FIG. 5 shows a single sign-on methodology 500 for user equipment to access multiple applications respectively provided by multiple network slices according to one embodiment. More particularly, methodology 500 illustrates a single sign-on (SSO) service for the same UE to access two applications respectively provided by two network slices, i.e., massive IoT in network slice #2 (104-2) and eMBB in network slice #1 (104-1). It is assumed that a user with a UE is accessing a mobile multimedia service (eMBB) provided by the network slice #1 which is an EPS network. After some time, the user with the same UE plans to access a massive IoT service provided by the network slice #2 which is also an EPS network. In this case, there is no need to do mutual authentication between the user and the network slice #2 since the authentication result and related security context of the user in the network slice #1 can be reused for the network slice #2. It is further assumed that there is no roaming for the user connecting to two network slices.

Following creation of the function chains depicted across the top of FIG. 5, authentication methodology 500 is performed. Note that the enumerated steps described below correspond to the steps labeled in FIG. 5.

Step 0. The UE (of device 102) is connected to network slice #1 and accessing multimedia services. The same UE plans to connect to network slice #2 and access a massive IoT service. The UE is aware of connecting to network slice #1 and agrees to use the authentication result of network slice #1 to register for network slice #2. The UE sends the message Attach Request to Access AuthN GW function 114-2 in network slice #2.

Step 1. The Access AuthN GW function 114-2 in network slice #2 extracts/separates authentication-related information (e.g., UE security capability, GUTI with corresponding network slice number i.e. network slice #1, etc.) from the Attach Request and composes a message, i.e., Authentication Request (GUTI with corresponding network slice number, i.e. network slice #1, "EPS_AKA", UE other security capability, "login with SSO", etc.). Then, the Access AuthN GW function 114-2 forwards Authentication Request to the Authenticator function 144-2 in network slice #2. Again here, note that the Authenticator function is assumed to be the H-Authenticator 144, but in alternative embodiments that involve roaming, can include the V-Authenticator function 134.

Step 2. The Authenticator function 144-2 in network slice #2 receives the message Authentication Request (GUTI with corresponding network slice number, i.e., network slice #1, "EPS_AKA", UE other security capability, "login with SSO", etc.) and contacts the Authenticator function 144-1 in network slice #1 to retrieve authentication data. The Authenticator function 144-2 in network slice #2 sends the message SSO Request (GUTI with corresponding network slice number, i.e., network slice #1, "EPS_AKA", UE other security capability, "login with SSO", etc.) to the Authenticator function 144-1 in network slice #1 via the Authentication Orchestrator 132-2 in network slice #2, master Authentication Orchestrator 120, and Authentication Orchestrator 132-1 in network slice #1.

Step 3. The Authenticator function 144-1 in network slice #1 retrieves the IMSI from the GUTI/TMSI-IMSI Mapping function 136-1 through the messages IMSI Request/Response.

Step 4. The Authenticator function 144-1 in network slice #1 derives the key $KEY_{NS}$ from $K_{ASME}$ which has been obtained from the key negotiation between the UE and the Authenticator function 144-1 in network slice #1.

Step 5. The Authenticator function 144-1 in network slice #1 responds to the Authenticator function 144-2 in network slice #2 with $KSI_{ASME}$ and the key $KEY_{NS}$ via the Authentication Orchestrator 132-1 in network slice #1, master Authentication Orchestrator 120, and Authentication Orchestrator 132-2 in network slice #2. The response message is SSO Response.

Step 6. The Authenticator function 144-2 in network slice #2 derives K"ASME from $KEY_{NS}$, $K''_{MME}$ from $K''_{ASME}$, and $K''_{eNB}$ from $K''_{MME}$.

Step 7. The Authenticator function 144-2 in network slice #2 sends the message Authentication Response ($KSI_{ASME}$) to the Access AuthN GW function 114-2 in network slice #2 (sub-step 7.1). The Authenticator function 144-2 in network slice #2 stores the authentication status and assigns the temporary identity GUTI for the user, and then stores the mapping relationship between GUTI and IMSI into the GUTI/TMSI-IMSI mapping function 136-2 through the messages IMSI-GUTI Storage Request/Response (sub-steps 7.2). It is possible for Other Network functions 502 to assign GUTI for this user (sub-step 7.3). In this case, the Authenticator function notifies the corresponding network function to assign GUTI for this user. The Authenticator function notifies Other Network functions 502, such as, but not limited to, mobility management, that the authentication of the user is successful. Other Network functions 502 can go further to allocate network resources for this user.

Step 8. The Access AuthN GW function 114-2 in network slice #2 derives $K''_{RRCenc}$, $K''_{RRCint}$, $K''_{UPenc}$, and $K''_{UPint}$ from $K''_{eNB}$ (sub-step 8.1) and then sends keys and related indicators to the Confidentiality/Integrity function 116-2 in network slice #2 through the messages Key & Indicator Notify request/response (sub-step 8.2).

Step 9. The Access AuthN GW function 114-2 in network slice #2 sends the message Key Materials Notify Request ($KSI_{ASME}$) to the UE.

Step 10. The UE derives the key $KEY_{NS}$ from $K_{ASME}$ (negotiated between UE and Authenticator function 144-1 in network slice #1), derives $K''_{ASME}$ from $KEY_{NS}$, derives $K''_{MME}$ from $K''_{ASME}$, derives $K''_{eNB}$ from $K''_{MME}$, derives $K''_{RRCenc}$, $K''_{RRCint}$, $K''_{UPenc}$, and $K''_{UPint}$ from $K''_{eNB}$.

Step 11. The UE responds to the Access AuthN GW function 144-2 in network slice #2 with the message Key Materials Notify Response.

Figure 6:
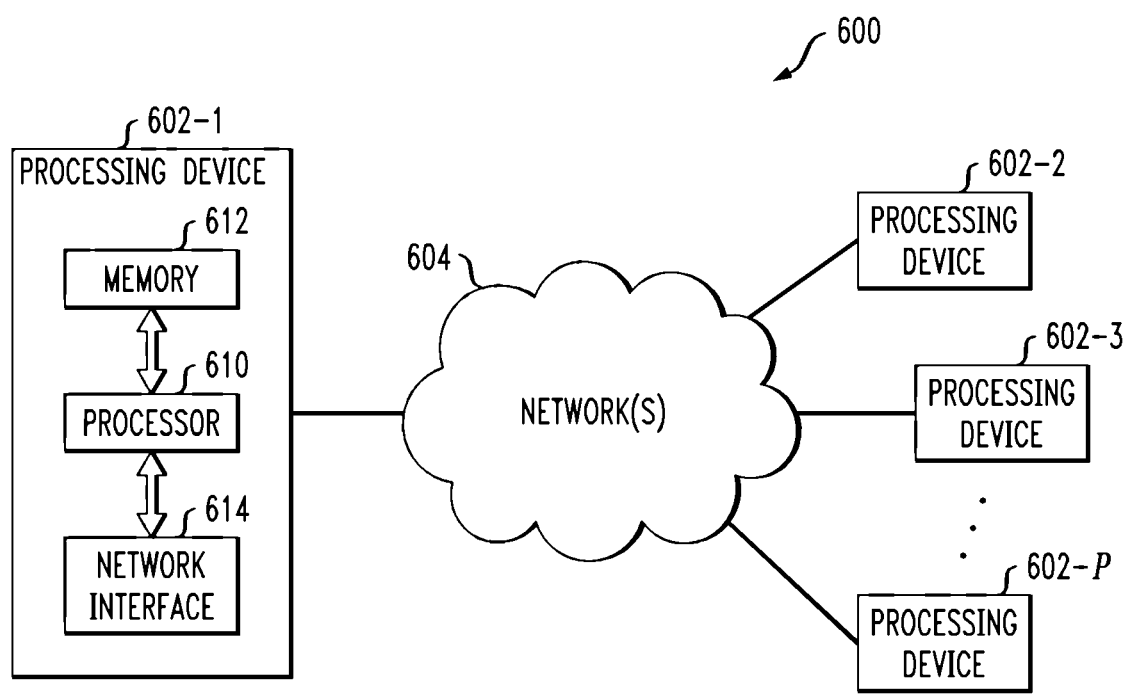
FIG. 6 shows a processing platform on which a unified authentication architecture is implemented according to one or more embodiments.

Step 12. The UE receives the message Attach Response from the network slice #2. Turning now to FIG. 6, a processing platform is shown on which a unified authentication architecture (e.g., 100 in FIG. 1) is implemented according to one or more embodiments. The processing platform 600 in this embodiment comprises a plurality of processing devices denoted 602-1, 602-2, 602-3, . . . 602-P, which communicate with one another over a network 604. One or more of the components and/or modules of architecture 100 (e.g., APIs, components, databases, etc.) may therefore each run on one or more computers or other processing platform elements, each of which may be viewed as an example of what is more generally referred to herein as a "processing device." As illustrated in FIG. 6, such a device generally comprises at least one processor and an associated memory, and implements one or more functional modules for instantiating and/or controlling features of systems and methodologies described herein. Multiple elements or modules may be implemented by a single processing device in a given embodiment.

The processing device 602-1 in the processing platform 600 comprises a processor 610 coupled to a memory 612. The processor 610 may comprise a microprocessor, a microcontroller, an application-specific integrated circuit (ASIC), a field programmable gate array (FPGA) or other type of processing circuitry, as well as portions or combinations of such circuitry elements. Components of a system as disclosed herein can be implemented at least in part in the form of one or more software programs stored in memory and executed by a processor of a processing device such as processor 610. Memory 612 (or other storage device) having such program code embodied therein is an example of what is more generally referred to herein as a processor-readable storage medium. Articles of manufacture comprising such processor-readable storage media are considered embodiments. A given such article of manufacture may comprise, for example, a storage device such as a storage disk, a storage array or an integrated circuit containing memory. The term "article of manufacture" as used herein should be understood to exclude transitory, propagating signals.

Furthermore, memory 612 may comprise electronic memory such as random access memory (RAM), read-only memory (ROM) or other types of memory, in any combination. The one or more software programs when executed by a processing device such as the processing device 602-1 causes the device to perform functions associated with one or more of the components/steps of system/methodology 500. One skilled in the art would be readily able to implement such software given the teachings provided herein. Other examples of processor-readable storage media embodying embodiments may include, for example, optical or magnetic disks.

Also included in the processing device 602-1 is network interface circuitry 614, which is used to interface the processing device with the network 604 and other system components. Such circuitry may comprise conventional transceivers of a type well known in the art.

The other processing devices 602 of the processing platform 600 are assumed to be configured in a manner similar to that shown for processing device 602-1 in the figure.

The processing platform 600 shown in FIG. 6 may comprise additional known components such as batch processing systems, parallel processing systems, physical machines, virtual machines, virtual switches, storage volumes, logical units, etc. Again, the particular processing platform shown in FIG. 6 is presented by way of example only, and the architecture 100 of FIG. 1 may include additional or alternative processing platforms, as well as numerous distinct processing platforms in any combination.

Also, numerous other arrangements of servers, computers, storage devices or other components are possible. Such components can communicate with other elements of the system over any type of network, such as a wide area network (WAN), a local area network (LAN), a satellite network, a telephone or cable network, a storage network, a converged network or various portions or combinations of these and other types of networks.

Furthermore, it is to be appreciated that the processing platform 600 of FIG. 6 can comprise virtual machines (VMs) implemented using a hypervisor. A hypervisor is an example of what is more generally referred to herein as "virtualization infrastructure." The hypervisor runs on physical infrastructure. Processing platform 600 may also include multiple hypervisors, each running on its own physical infrastructure. As is known, VMs are logical processing elements that may be instantiated on one or more physical processing elements (e.g., servers, computers, processing devices). That is, a VM generally refers to a software implementation of a machine (i.e., a computer) that executes programs like a physical machine. Thus, different VMs can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

As described herein, illustrative embodiments provide a unified authentication architecture to meet different security requirements from 5G (or similar) services/applications (e.g., eMBB services, massive IoT services, mission-critical IoT services) as well as to provide key negotiation and agreement for confidentiality and integrity protection. More particularly, illustrative embodiments provide a flexible architecture for security service on demand so that different security requirements from different applications can be met without altering underlying network topology. This architecture can be used to design 5G security with different security requirements from various scenarios including, but not limited to, eMBB, massive IoT and critical IoT. It is to be understood that IoT services, such as massive IoT, mission-critical IoT, and other IoT services, can be considered examples of a broader classification of services referred to herein as "machine-to-machine" services. In such a service, one machine (e.g., IoT device) communicates with at least one other machine (e.g., another IoT device). Illustrative embodiments may be implemented with one or more machine-to-machine services.

In the various scenarios illustratively described herein, it is to be appreciated that the security service being provided by the instantiated security service function chain is mutual authentication between a subscriber and the network for eMBB service, or mutual authentication between a device and the network for an IoT service. This means that the authentication is either for a subscriber using a device with a subscriber or user identity module/card (e.g., eMBB service) or for a device with no subscriber or user identity module/card (e.g., massive IoT service). As such, while the distinction between a subscriber and a device for purposes of access authentication are specified herein, a subscriber (using a device with a subscriber or user identity module, e.g., Subscriber Identity Module (SIM) card, Universal Mobile Telecommunication System (UMTS) SIM (USIM) card, User Identity Module (UIM) card, removable UIM (R-UIM) card) or a device (with no SIM/USIM/UIM/R-UIM card) may be generally referred to herein as an entity accessing or seeking access (or more simply an "entity") to a network slice, network service, and/or communication network. However, other entities accessing or seeking access may also be characterized in this manner.

Although certain illustrative embodiments are described herein in the context of communication networks utilizing particular communication protocols, other types of networks can be used in other embodiments. As noted above, the term "network" as used herein is therefore intended to be broadly construed. Further, it should be emphasized that the embodiments described above are for purposes of illustration only, and should not be interpreted as limiting in any way. Other embodiments may use different types of network, device and module configurations, and alternative communication protocols, process steps and operations for implementing a unified authentication architecture. The particular manner in which network nodes communicate can be varied in other embodiments. Also, it should be understood that the particular assumptions made in the context of describing the illustrative embodiments should not be construed as requirements of the inventions. The inventions can be implemented in other embodiments in which these particular assumptions do not apply. These and numerous other alternative embodiments within the scope of the appended claims will be readily apparent to those skilled in the art.

What is claimed is:

1. A method performed by a processing device, the method comprising:

creating, by a master authentication orchestrator function, at least one security service function chain comprising a set of security service functions, wherein the at least one security service function chain is created in response to instantiation of a given network partition in a communication network, wherein the communication network supports instantiation of a plurality of network partitions for providing a respective plurality of network services, each network partition of the plurality of network partitions including an authentication orchestrator created by the master authentication orchestrator function, and the master authentication orchestrator function is located on a core network included in the communication network; and utilizing the at least one security service function chain to perform at least one security service for a client device performing one of accessing or seeking access to a network service corresponding to the given network partition, the at least one security service including facilitating a single sign-on (SSO) operation for the client device for the network service corresponding to the given network partition and another network service corresponding to another network partition, the SSO operation including transmitting a SSO request from the authentication orchestrator of the another network partition to the master authentication orchestrator function, and receiving a SSO response from the authentication orchestrator of the given network partition from the master authentication orchestrator function.

2. The method of claim 1, wherein the at least one security service comprises mutual authentication between the client device and the communication network.

3. The method of claim 2, wherein the creation of the security service function chain utilized to perform the mutual authentication is managed by the authentication orchestrator for the given network partition.

4. The method of claim 3, wherein each of the security service function chains comprise at least a subset of an authentication gateway function, an authentication function, an identity mapping function, and a confidentiality and integrity function.

5. The method of claim 4, wherein the authentication gateway function is configured to:
receive a message from the client device;
extract authentication information from the received message;
compose an authentication request message from the extracted authentication information; and
forward the authentication request message to the authentication function.

6. The method of claim 4, wherein the authentication gateway function is configured to:
receive an authentication-related message from the authentication function;
integrate authentication information from the received message into an access response message; and
forward the access response message to the client device.

7. The method of claim 4, wherein the authentication gateway function is configured to:
receive key-related information from the authentication function; and
forward the key-related information to the confidentiality and integrity function.

8. The method of claim 4, wherein the authentication function is configured to:
determine, from a plurality of authentication mechanisms, an authentication mechanism to use to perform access mutual authentication between the client device and the communication network.

9. The method of claim 4, wherein the authentication function is configured to retrieve, from the identity mapping function, an actual identity associated with the client device based on a temporary identity associated with the client device assigned by the communication network.

10. The method of claim 4, wherein the authentication function operating in a visited domain network in the communication network is configured to obtain, through the authentication orchestrator of the given network partition, authentication information for the client device from another authentication function in a home domain network in the communication network.

11. The method of claim 4, wherein the authentication function is configured to:
maintain a database of authentication status and security context for a plurality of client devices performing one of accessing or seeking access to the communication network through the given network partition.

12. The method of claim 11, wherein the authentication function is configured to:
reference the database of authentication status and security context for the client device to avoid performing a mutual authentication between the client device and the target network in response to after the client device initiating a handover to a target network.

13. The method of claim 4, wherein the identity mapping function is configured to manage a relationship between an actual identity associated with the client device and a temporary identity assigned to the client device by the communication network.

14. The method of claim 4, wherein the confidentiality and integrity function is configured to provide protection for signaling messages on a control plane of the network partition and for user data on a user plane of the network partition.

15. The method of claim 3, wherein the authentication orchestrator for the given network partition is created and managed by the master authentication orchestrator function.

16. The method of claim 15, wherein the master authentication orchestrator is configured to:
instantiate another authentication orchestrator function for another network partition during a scale-out operation; and
terminate another authentication orchestrator function for another network partition during a scale-in operation.

17. The method of claim 3, wherein the authentication function is a first authentication function, and the authentication orchestrator for the given network partition is configured to instantiate a second authentication function for another network partition during a scale-out operation.

18. The method of claim 3, wherein the authentication function is a first authentication function, and the authentication orchestrator for the given network partition is configured to instantiate a second authentication function for the given network partition when the first authentication function fails.

19. The method of claim 3, wherein the authentication orchestrator for the given network partition is configured to provision and configure the authentication function.

20. The method of claim 3, wherein the authentication orchestrator for the given network partition is configured to terminate another authentication function for another network partition during a scale in operation.

21. The method of claim 1, wherein the utilizing the security service function chain to perform at least one security service for the client device further comprises:
utilizing the security service function chain to facilitate authenticated access by the client device to the network service corresponding to the given network partition.

22. The method of claim 1, wherein the utilizing the security service function chain to perform at least one security service for the client device further comprises:
utilizing the security service function chain to facilitate handover of the client device from a source network to a target network while maintaining access to the network service corresponding to the given network partition.

23. The method of claim 1, wherein the network service corresponding to the given network partition comprises an enhanced multimedia broadband service.

24. The method of claim 1, wherein the network service corresponding to the given network partition comprises a machine-to-machine service.

25. An article of manufacture comprising a processor-readable non-transitory storage medium having embodied therein executable program code that when executed by a processing device causes the processing device to perform:
create, by a master authentication orchestrator function, at least one security service function chain comprising a set of security service functions, wherein the at least one security service function chain is created in response to instantiation of a given network partition in a communication network, wherein the communication network supports instantiation of a plurality of network partitions for providing a respective plurality of network services, each network partition of the plurality of network partitions including an authentication orchestrator created by the master authentication orchestrator function, and the master authentication orchestrator function is located on a core network included in the communication network; and
utilize the security service function chain to perform at least one security service for a client device performing one of accessing or seeking access to a network service corresponding to the given network partition, the at least one security service including facilitating a single sign-on (SSO) operation for the client device for the network service corresponding to the given network partition and another network service corresponding to another network partition,
the SSO operation including transmitting a SSO request from the authentication orchestrator of the another network partition to the master authentication orchestrator function, and receiving a SSO response from the authentication orchestrator of the given network partition from the master authentication orchestrator function.

26. An apparatus comprising:
a memory; and
at least one processor operatively coupled to the memory to form a unified security architecture, the unified security architecture being configured to:
create, by a master authentication orchestrator function, at least one security service function chain comprising a set of security service functions, wherein the at least one service function chain is created in response to instantiation of a given network partition in a communication network, wherein the communication network supports instantiation of a plurality of network partitions for providing a respective plurality of network services, each network partition of the plurality of network partitions including an authentication orchestrator created by the master authentication orchestrator function, and the master authentication orchestrator function is located on a core network included in the communication network; and
utilize the security service function chain to perform at least one security service for a client device performing one of accessing or seeking access to a network service corresponding to the given network partition, the at least one security service including facilitating a single sign-on (SSO) operation for the client device for the network service corresponding to the given network partition and another network service corresponding to another network partition,
the SSO operation including transmitting a SSO request from the authentication orchestrator of the another network partition to the master authentication orchestrator function, and receiving a SSO response from the authentication orchestrator of the given network partition from the master authentication orchestrator function.

\* \* \* \* \*